M. C. ST. JOHN.
METALLIC TREAD FOR PNEUMATIC TIRES.
APPLICATION FILED DEC. 20, 1906.

909,475. Patented Jan. 12, 1909.

Witnesses.

Miles C. St. John.
Inventor.

UNITED STATES PATENT OFFICE.

MILES C. ST. JOHN, OF CHICAGO, ILLINOIS.

METALLIC TREAD FOR PNEUMATIC TIRES.

No. 909,475.　　　Specification of Letters Patent.　　　Patented Jan. 12, 1909.

Application filed December 20, 1906. Serial No. 348,807.

*To all whom it may concern:*

Be it known that I, MILES C. ST. JOHN, a citizen of the United States, residing at Chicago, in the county of Cook and State of Illinois, have invented certain new and useful Improvements in Metallic Treads for Pneumatic Tires, of which the following is a specification.

This invention relates to metallic treads for pneumatic tires and the object is to provide a simple and inexpensive device which can be readily secured in position upon a tire, and which will effectively protect said tire from injury by reason of puncture or the like.

The invention is, furthermore, designed to prevent the tire from slipping when in use, and to preserve the resiliency of said tire. I attain this result by constructing my device in the manner described herein and illustrated in the accompanying drawings, which are a part of this specification.

Figure 1:
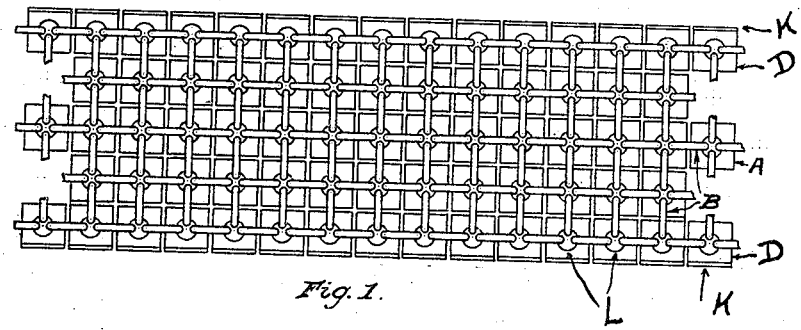
Figure 4:
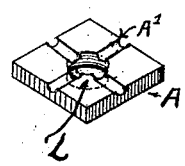
Figure 6:
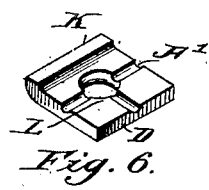
Figure 2:
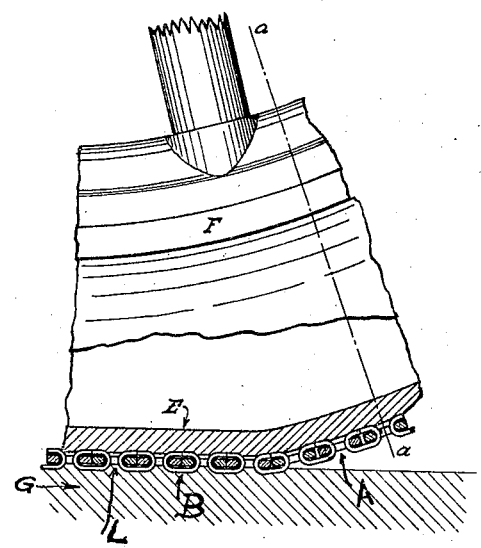
Figure 5:
Figure 8:
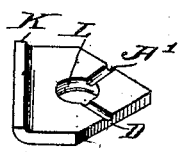
Figure 3:
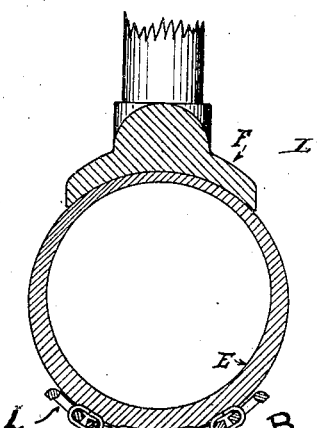
Figure 7:
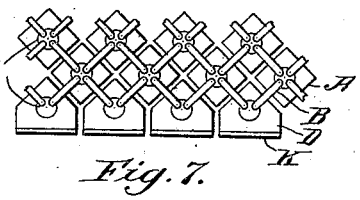

Figure 1 is a plan view of a portion of my tread for pneumatic tires, showing the blocks and links; Fig. 2 is an elevation of a part of a wheel equipped with the device, which is shown partly in section; Fig. 3 is a cross-section of same taken on line *a a* of Fig. 2; Fig. 4 is a perspective view of one of the blocks; Fig. 5 is a perspective view of one of the links; Fig. 6 is a perspective view of a block, showing the flange on the outer end thereof; Fig. 7 is a plan view of a modification of the arrangement of the blocks and links; Fig. 8 is a perspective view of one of the side blocks used in the arrangement shown in Fig. 7.

My invention consists, essentially, of a series of blocks A, of metal or other suitable material, formed substantially in the manner as shown in the drawings. These blocks are arranged side by side and connected by links B, forming a continuous band which is adapted to be placed about a pneumatic vehicle tire of ordinary construction. The blocks A are preferably square and provided with perforation L. Said blocks are also provided, on one surface thereof, with the grooves A' into which the links B will fit when a series of blocks are connected together. The links B are connected to the blocks A in such a manner as to permit the blocks and links to act freely with relation to each other to produce the desired flexibility.

The pneumatic tire E may be of ordinary construction and is shown as mounted upon the rim F of a vehicle wheel. G represents a section of earth at the point of contact with the tire E. The weight of the vehicle flattens the tread of the tire considerably at this point, decreasing the distance between the blocks A, until the same practically touch each other, thus forming a very effective protection for the tire.

In the construction shown in Fig. 1 the blocks A are arranged in rows with the edges of the blocks extending longitudinally and transversely of the band and the blocks D of each outside row are provided with downturned flanges K at the outer edges as shown in Figs. 3 and 6. In the construction shown in Figs. 7 and 8 the intermediate blocks are arranged with their edges directed at an angle with the length of the band providing triangular spaces between adjacent blocks in the outer rows. The blocks D forming said outer rows are provided with diverging sides to fit in said triangular spaces which are parallel from about the center of the aperture L to the outer edge and the outer side is flanged outwardly as before described. The blocks are provided with recesses A', as before described, so that the links on the inner or tread side may be retained in proper position and be approximately flush with the contacting faces of the blocks.

To put the tread on or off the tire it is only necessary to deflate the tire, then it can be readily removed. The pressure of the inflated tire is usually sufficient to hold the tread securely in place.

Slight changes can of course be made in the general form and arrangement of the several parts described, as for instance, such as arranging the blocks A in direct alinement with relation to each other or upon a bias, without departing from the spirit and scope of my invention, hence I do not wish to be limited to the exact construction herein set forth.

What I claim as new and desire to secure by Letters Patent, is—

1. A metallic tread comprising blocks each provided with a central aperture and recesses in a face of the block extending from said aperture to the edges of the block and links extending through said central apertures in adjacent blocks and lying in said recesses adapting each block to move independently of the others.

2. In a tread of the class described the combination with blocks provided with central apertures, links extending through the apertures in said blocks and connecting the blocks to move independently of each other and blocks adapted to form the outer rows of the tread having diverging sides adapted to fit between adjacent blocks and having an outward flange on its outer edge.

In testimony whereof I have signed my name in the presence of two subscribing witnesses.

MILES C. ST. JOHN.

Witnesses:
J. M. SWANSTROUS,
J. H. BIRMINGHAM.